June 14, 1955 M. T. MILLER 2,710,736
SELF-CLOSING FAUCETS
Filed June 20, 1951
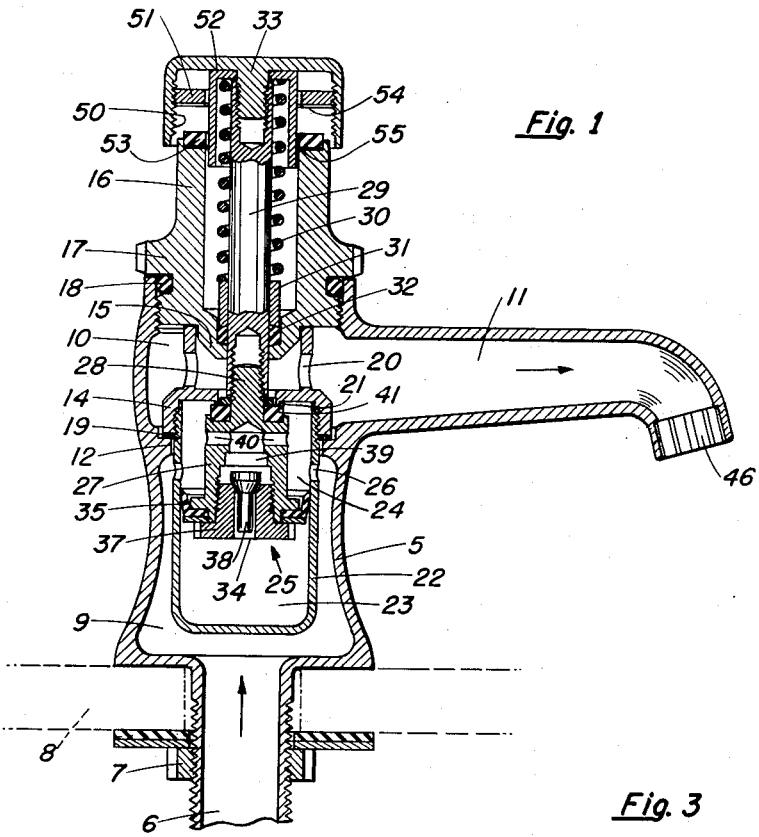
Fig. 1
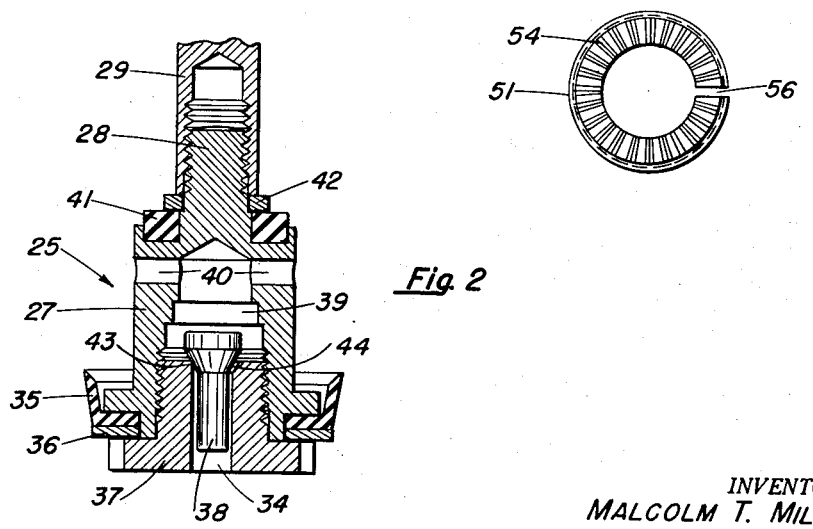
Fig. 2
Fig. 3
INVENTOR.
MALCOLM T. MILLER.
BY
Parker & Carter
ATTORNEYS.

United States Patent Office 2,710,736
Patented June 14, 1955

2,710,736

SELF-CLOSING FAUCETS

Malcolm T. Miller, Oak Park, Ill., assignor to Sloan Valve Company, Chicago, Ill., a corporation of Illinois Application June 20, 1951, Serial No. 232,562

2 Claims. (Cl. 251—51)

This invention relates in general to water faucets, but more particularly to a faucet of the self-closing type for use on a lavatory or sink, and the principal object of the invention is to design a new and improved faucet of the foregoing type.

Another object of the invention is to provide a new and improved self-closing faucet which is arranged so that the retarded closing action of the device is always at a constant rate irrespective of variations in the pressures of the inlet water supply.

Another object is to provide a novel self-closing faucet having a dashpot and a piston together with a by-pass valve located in the piston arranged to retard the closing movement of the faucet but permitting rapid opening movement when the faucet is opened.

Further objects are to design a new and improved self-closing faucet which is reliable and effective in operation; is readily adjustable to vary the amount of water discharged; and is easy to manufacture and to assemble.

The accompanying drawings illustrate a preferred embodiment of the invention in which:

Fig. 1 is a cross-sectional elevation of the self-closing faucet showing the invention;

Fig. 2 is a fragmentary enlarged cross-section of the piston; and

Fig. 3 is a bottom view of the adjusting washer.

Referring to the drawings, Fig. 1, the faucet includes primarily a body or casing 5, preferably made of brass, having a lower externally threaded inlet water supply connection 6 accommodating a nut 7, whereby the body 5 may be suitably clamped in position for example on the back ledge 8 of a lavatory or other support. The body 5 has a lower inlet chamber 9 and an upper outlet chamber 10, from which a horizontal discharge spout 11 extends. Arranged in the body between the lower chamber 9 and upper chamber 10 is a shoulder 12 upon which a collar 14 is adapted to rest. This collar 14 is hollow at its upper end to accommodate a centering plug 15 formed in the bonnet 16. The bonnet 16 has the usual attaching nut 17 formed thereon for threading the bonnet 16 into the top of chamber 10 of the body 5 to close off the chamber. A suitable packing ring 18 may be inserted under the nut 17 to seal off the connection. Threading the bonnet 16 into the body 5 forces the plug 15 into collar 14, and thereby securely clamps it upon the shoulder 12. A suitable gasket 19 is interposed on the ledge 12 to seal off the upper from the lower chamber. Oppositely disposed openings 20 are arranged in the sides of the collar 14 and an axially disposed water passage extends from the bottom of the collar surrounded by a valve seating portion 21.

The lower chamber 9 has arranged therein a dashpot which includes a cup-shaped member 22 depending from collar 14 and threaded into the same. The dashpot has a lower chamber 23 and an upper chamber 24 therein between which there is a piston slidably arranged indicated generally at 25. In the upper chamber 24, a pair of orifices 26 are arranged in the sides of cup member 22 to permit entry of the water from the lower casing chamber 9 into chamber 24. The total area of the openings 26 is somewhat less than the valve seat opening 21 in collar 14 for a purpose which will be pointed out later.

The piston 25, as is seen more clearly in the enlarged view Fig. 2, comprises a body portion 27 of cylindrical shape having an upper threaded stud 28 which is screwed into the lower end of the faucet operating stem 29. The stem 29 extends upwardly through the bonnet 16 and is encircled by a relatively stiff restoring spring 30, one end of which is arranged to normally exert tension against a sliding collar 31 on the stem 29 and against the packing 32 to seal off the stem 29 from the water pressure. At the upper end of operating stem 29 there is provided a manual operating button 33 which is threaded into the end of the stem as shown.

Attached to the body 27 of the piston 25 is a rubber cup member 35 clamped in place by a brass washer 36 and a stud 37 threaded into the interior of the body 27. The stud 37 has an axial opening 34 within which a by-pass valve member 38 is loosely arranged. Above the by-pass valve 38 there is a chamber 39 formed in the piston body 27, together with a pair of oppositely disposed openings 40 extending through the sides of the piston. On top of piston body 27 there is a rubber valve member 41 which is clamped to the threaded stud 28 with a washer 42 by the operating stem 29. The valve member 41 is adapted to open and close on the valve seat 21 formed in the bottom of collar 14. The by-pass valve 38 normally rests by gravity upon a valve seat 43 formed in the upper end of the threaded stud 37 and on this valve seat there is provided a small by-pass opening 44 in the form of a slot which is not closed off when the by-pass valve 38 is resting on the seat 43.

It will be seen that in the normal position of the faucet, the restoring spring 30 will hold the operating stem 29 in an upward position, so that the valve member 41 is resting normally upon the valve seat 21, closing off the flow of water between the lower chamber 9 and the inlet 6 to the discharge spout 11. The water pressure is likewise exerted within the dashpot 22, but is equalized in both the lower chamber 23 and upper chamber 24 by virtue of the by-pass opening 44.

In the operation of the self-closing faucet, it is intended that upon a single downward thrust of the operating button 33, the faucet will immediately open wide for its full flow and then gradually or slowly close for a predetermined time interval, this retarding action taking place at a constant rate irrespective of pressure variations of the water supply from the inlet pipe 6. Forcing down the operating stem 29 opens the valve member 41 from seat 21 and likewise forces the piston 25 downwardly into the lower dashpot chamber 23. This action can take place rapidly because the by-pass valve 38 is forced upwardly off of its seat 43 to permit full flow of water through the axial opening 34 from the chamber 23. Likewise, the cup member 35 will be collapsed inwardly permitting water to pass around the sides of the same. Water flow now takes place from the inlet supply pipe 6, through lower chamber 9, openings 26 in the dashpot member 22, the valve opening in collar 14 surrounded by valve seat 21, through the lateral openings 20 and out through discharge spout 11.

When the operating button 33 is released, the stem 29 and along with it the piston 25 are permitted to slowly move upward under control of the stored up energy in the restoring spring 30, so the valve member 41 gradually approaches its seat 21. Immediately that the restoring action occurs, the by-pass valve member 38 drops down upon its seat 43, whereby a small passage for water flow now exists through the by-pass 44 to permit pressure to be gradually built up in the lower chamber 23 of the dashpot 22. The cup-shaped member 35 is now flared out due to the predominating pressure in the upper chamber 24, but the spring 30 will have full control in the restoring action to gradually close the valve 41.

The area of the openings 26 in dashpot 22 are so sized that they are somewhat smaller than the area of the valve opening controlled by valve member 41 for the purpose of preventing any back pressure in chamber 24 from affecting the restoring operation of the valve member 41. Accordingly, any pressure variations of the inlet water supply can have no effect in either accelerating or retarding the restoring action of the valve, and the rate at which the restoring action takes place will always be constant in order to preserve the predetermined timing action upon each operation of the operating button 33. When the valve operating member 41 finally contacts the valve seat 21, the water flow through the faucet is terminated. The pressures between the lower dashpot chamber 23 and upper dashpot chamber 24 are then also equalized.

Due to the fact that the by-pass valve 38 is moved from its seat 43 each time that the operating button 33 is depressed, a large opening 34 is provided to the interior of the piston 39 to flush out the same, so that there will be no possibility of clogging the by-pass opening 44 to interfere with the regular operation of the piston 25.

It is desirable in many cases to provide for an adjustment of the self-closing faucet to regulate the timing action and indirectly the quantity of water discharged. This adjustment according to the present invention takes the form of an inner threaded portion 50 in button 33 in which is threaded a ring-shaped member or washer 51, which in turn surrounds an inverted cup member 52. Cup member 52 is clamped at one end between stem 29 and the bottom of button 33, and is arranged to encompass one end of the restoring spring 30 and serve to guide the same. Recessed in the top of the bonnet 16 is a rubber washer 53 which normally rests on a series of radial serrations 55 formed in the top of bonnet 16. A similar set of serrations 54 is arranged as shown in Fig. 3 in the bottom of the adjusting washer 51. It is preferable that the adjusting washer 51 be split as shown at 56 to provide tension against the threads 50 to more firmly retain the washer 51 in its adjusted position. The position of the washer 51 inside button 33 determines the amount of downward movement of the button 33 by contacting the rubber washer 53 on bonnet 16, and therefore determines the time required for the faucet to close.

In order to adjust the gap between washer 51 and bonnet 16 to provide for any desired timing of the faucet, the button 33 is first depressed and then given a clockwise rotation. This will force the serrations 54 of washer 51 into the fixed rubber washer 53 and enable a turning action of adjusting washer 51 to take place upon the threads 50 to widen the gap between the bonnet and the washer 51. When the button 33 is turned in a counterclockwise direction, the distance is made narrower. This provides a simple and easy method to adjust the timing of the faucet. An advantage of the adjusting arrangement disclosed, is that it is not readily apparent to the average person that it can be made, and only an authorized person can perform the adjustment. In order to break up the stream discharge and to prevent splashing in the lavatory from the spout 11, it is desirable that a screen 46 or other similar device be inserted in the nozzle as shown.

While only a preferred embodiment of the invention has been disclosed, it will be readily apparent that certain variations in the same can be made without departing from the spirit of the invention, and it is therefore to be understood that the invention is not to be limited to the same, but only by the scope of the appended claims.

What is claimed is:

1. In an adjusting arrangement for a self-closing faucet in which a cup-shaped push button is adapted to actuate an operating stem with an inward thrust of the push button to open the faucet and in which means are provided for slowly closing the faucet during a time interval, a washer adjustable inside said push button and around said stem, cooperating threads on the inside wall of said push button and the periphery of said first washer, a second washer fixed on said faucet around said stem and normally spaced from said first washer, said second washer contacted by said first washer when said push button is operated to thereby limit the stroke of said push button, and cooperating means on said washers responsive to the manual rotation of said push button after it is operated inwardly, for threadedly adjusting the position of said first washer in said push button with respect to said second washer to vary the stroke of said push button and thereby change the closing time of said faucet.

2. In an adjusting arrangement for a self-closing faucet in which a cup-shaped push button is adapted to actuate an operating stem with an inward thrust of the push button to open the faucet and in which means are provided for slowly closing the faucet during a time interval, a washer adjustable inside said push button and around said stem, a second washer fixed on said faucet around said stem and normally spaced from said first washer, said first washer having serrations on the bottom side thereof and being threadedly engaged with the inside of said push button, said second washer being made of flexible material, the inward actuation of said stem by said push button being effective to move said washers into contact with each other to limit the stroke of said push button, and the subsequent rotation of said push button after it is operated inwardly being effective to cause the adjustment of said first washer in said push button by the serrations of said washer engaging said flexible second washer, whereby the stroke of said push button is changed and the closing time of said faucet is altered.

References Cited in the file of this patent

UNITED STATES PATENTS

| | | |
|---|---|---|
| 690,011 | Blake | Dec. 31, 1901 |
| 891,285 | Nethery | June 23, 1908 |
| 985,757 | Haws | Feb. 28, 1911 |
| 1,176,754 | Hedges | Mar. 28, 1916 |
| 1,856,664 | Steen | May 3, 1932 |
| 2,181,581 | Fraser | Nov. 28, 1939 |
| 2,212,308 | Steen | Aug. 20, 1940 |
| 2,614,791 | Murray | Oct. 21, 1952 |

FOREIGN PATENTS

| | | |
|---|---|---|
| 392,151 | Great Britain | May 9, 1933 |
| 431,448 | Great Britain | July 8, 1935 |